US009702404B2

(12) United States Patent
Smedresman et al.

(10) Patent No.: US 9,702,404 B2
(45) Date of Patent: Jul. 11, 2017

(54) INTEGRAL CENTERING SPRING AND BEARING SUPPORT AND METHOD OF SUPPORTING MULTIPLE DAMPED BEARINGS

(71) Applicant: United Technologies Corporation, Hartford, CT (US)

(72) Inventors: Adam G. Smedresman, Larchmont, NY (US); Kaleb Von Berg, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/925,150

(22) Filed: Oct. 28, 2015

(65) Prior Publication Data

US 2017/0122369 A1    May 4, 2017

(51) Int. Cl.
*F16C 23/08*    (2006.01)
*F16C 27/04*    (2006.01)

(52) U.S. Cl.
CPC ............ *F16C 27/045* (2013.01); *F16C 23/08* (2013.01); *F16C 2360/23* (2013.01)

(58) Field of Classification Search
CPC ...... F16C 19/527; F16C 23/08; F16C 27/045; F16C 2360/23; F16C 2360/24
See application file for complete search history.

(56) References Cited

U.S. PATENT DOCUMENTS 2,850,337 A    9/1958 McCallum
2,862,356 A    12/1958 Kent et al.
2,967,739 A    1/1961 Hoffmann
3,015,523 A    1/1962 Semar
3,679,272 A    7/1972 Costa et al.
3,705,775 A    12/1972 Rioux
3,737,109 A    6/1973 Johansson
3,738,719 A    6/1973 Langner
3,813,776 A    6/1974 Frederickson et al.
(Continued)

FOREIGN PATENT DOCUMENTS

EP    2060809 A1    5/2009
FR    3013760 A1    5/2015
JP    8326557 A    12/1996

OTHER PUBLICATIONS

Extended European Search Report for EP Application 16195677.6, dated Mar. 30, 2017, 6 pages.

*Primary Examiner* — James Pilkington
(74) *Attorney, Agent, or Firm* — Kinney & Lange, P.A.

(57) ABSTRACT

An assembly includes a centering spring having an annular flange, an annular body, and a plurality of resilient beams extending from the flange to the body. The annular flange defines a passage that extends at least radially inward with respect to a centerline circumscribed by the flange from a radially outer surface of the flange to a radially inner surface of the flange. The annular body is spaced from the flange along the centerline, a radially outer surface of the body forming a first annular cavity relative to an adjacent surface configured to be a first fluid damper. A deflection of the body relative to the flange is restrained by a restoring force produced by the plurality of resilient beams and the first fluid damper. A method includes providing the aforementioned assembly and passing a damping fluid through the passage of the flange.

20 Claims, 3 Drawing Sheets

(56) References Cited

U.S. PATENT DOCUMENTS

| | | |
|---|---|---|
| 4,084,861 A | 4/1978 | Greenberg et al. |
| 4,214,796 A | 7/1980 | Monzel et al. |
| 4,370,094 A | 1/1983 | Ambrosch et al. |
| 4,453,784 A | 6/1984 | Kildea et al. |
| 4,523,864 A | 6/1985 | Walter et al. |
| 4,668,108 A | 5/1987 | McHugh |
| 4,669,893 A | 6/1987 | Chalaire et al. |
| 4,693,616 A | 9/1987 | Rohra et al. |
| 4,867,655 A | 9/1989 | Barbie et al. |
| 4,872,767 A | 10/1989 | Knapp |
| 4,952,076 A | 8/1990 | Wiley, III et al. |
| 4,981,415 A | 1/1991 | Marmol et al. |
| 5,028,001 A | 7/1991 | Bender et al. |
| 5,044,781 A | 9/1991 | Werner |
| 5,051,005 A | 9/1991 | Duncan |
| 5,065,959 A | 11/1991 | Bhatia et al. |
| 5,088,840 A | 2/1992 | Radtke |
| 5,284,011 A | 2/1994 | Von Benken |
| 5,305,981 A | 4/1994 | Cunningham et al. |
| 5,332,070 A | 7/1994 | Davis et al. |
| 5,421,655 A | 6/1995 | Ide et al. |
| 5,433,584 A | 7/1995 | Amin et al. |
| 5,501,531 A | 3/1996 | Hamaekers |
| 5,531,522 A | 7/1996 | Ide et al. |
| 5,603,574 A | 2/1997 | Ide et al. |
| 5,603,602 A | 2/1997 | Romani |
| 5,613,781 A | 3/1997 | Kuzdzal et al. |
| 5,791,789 A | 8/1998 | Van Duyn et al. |
| 5,810,319 A | 9/1998 | von Flotow et al. |
| 5,947,240 A | 9/1999 | Davis et al. |
| 6,002,778 A | 12/1999 | Rossetti et al. |
| 6,082,959 A | 7/2000 | Van Duyn |
| 6,155,720 A | 12/2000 | Battig |
| 6,325,546 B1 | 12/2001 | Storace |
| 6,328,293 B1 | 12/2001 | Olsen |
| 6,394,387 B1 | 5/2002 | Mitrovic |
| 6,413,046 B1 | 7/2002 | Penn et al. |
| 6,439,772 B1 | 8/2002 | Ommundson et al. |
| 6,682,219 B2 | 1/2004 | Alam et al. |
| 6,783,319 B2 | 8/2004 | Doerflein et al. |
| 6,883,967 B2 | 4/2005 | Robb et al. |
| 6,942,451 B1 | 9/2005 | Alexander et al. |
| 7,066,651 B2 | 6/2006 | Nicholas et al. |
| 7,097,412 B2 | 8/2006 | DiTomasso |
| 7,121,729 B2 | 10/2006 | Davis et al. |
| 7,384,199 B2 | 6/2008 | Allmon et al. |
| 7,524,112 B2 | 4/2009 | Gerez et al. |
| 7,625,121 B2 | 12/2009 | Pettinato et al. |
| 7,731,426 B2 | 6/2010 | Meacham et al. |
| 8,104,972 B2 | 1/2012 | Maguire |
| 8,366,385 B2 | 2/2013 | Davis et al. |
| 8,439,637 B2 | 5/2013 | DiBenedetto et al. |
| 8,511,986 B2 | 8/2013 | Alvanos et al. |
| 8,511,987 B2 | 8/2013 | Reinhardt et al. |
| 8,727,629 B2 * | 5/2014 | Do .................. F01D 25/164 384/494 |
| 8,727,632 B2 * | 5/2014 | Do .................. F01D 25/164 384/472 |
| 8,794,912 B2 | 8/2014 | Nilsson et al. |
| 8,834,095 B2 | 9/2014 | Davis |
| 9,046,001 B2 | 6/2015 | Hindle et al. |
| 2006/0083448 A1 | 4/2006 | Alam et al. |
| 2006/0204153 A1 | 9/2006 | Alam et al. |
| 2009/0110572 A1 | 4/2009 | Meacham et al. |
| 2009/0123271 A1 | 5/2009 | Coffin et al. |
| 2009/0148271 A1 | 6/2009 | Alvanos et al. |
| 2010/0207007 A1 | 8/2010 | Cottrell et al. |
| 2011/0286836 A1 | 11/2011 | Davis |
| 2012/0328431 A1 | 12/2012 | Davis |
| 2013/0051981 A1 | 2/2013 | Hindle et al. |
| 2013/0051982 A1 | 2/2013 | Hindle et al. |
| 2013/0195646 A1 | 8/2013 | Merry et al. |
| 2015/0233293 A1 | 8/2015 | Grogg |

* cited by examiner

INTEGRAL CENTERING SPRING AND BEARING SUPPORT AND METHOD OF SUPPORTING MULTIPLE DAMPED BEARINGS

BACKGROUND

The present invention relates generally to gas turbine engines and more particularly, to centering springs used in gas turbine engines.

The rotating shafts and other rotating turbomachinery of gas turbine engines are supported from a non-rotating structure by arrays of anti-friction bearings. In many engines, anti-friction bearings are enclosed in bearing compartments that allow them to be more easily lubricated and cooled.

Many bearing compartments, especially those containing multiple damped bearings, have small interiors, making incorporation of oil jets, scoops, retaining features, seal assemblies, and other components as well as assembly, maintenance, and repair tasks difficult. In a damped bearing, the outer race is shaped to form an annular cavity between the outer race and the bearing support, which forms a squeeze film damper (SFD) when filled with a damping fluid. With this configuration, radial displacement of the outer race relative to the bearing support is restrained by squeeze film pressure. Other bearings within the compartment can be supported by a centering spring. These sprung bearings have an outer race that is typically press fit or incorporated into a monolithic centering spring, which in turn is fastened to a bearing support or clamped between a retaining nut and the bearing support. Some bearings combine the damped and sprung configuration by fitting an outer race of a bearing into a monolithic centering spring and forming a SFD between a portion of the centering spring and a static component (e.g., a casing or housing). In the sprung and damped configuration, the centering spring and SFD form a spring-damper system in which excitations are damped by the SFD.

One or more of the aforementioned bearing arrangements holds the rotor centerline of the gas turbine engine in an appropriate position and attenuates force transmission from the rotating shafts and other rotating machinery to the bearing support of the gas turbine engine. In a conventional configuration that includes two adjacent damped bearings, the centering spring spans between bearing supports, which contain fluid passages for delivering damping fluid to the outer races of each bearing. However, such conventional centering spring configurations are costly to fabricate because multiple parts with a number of tightly-toleranced interfaces must be sized, machined, and assembled. To accommodate the bearing supports without enlarging the bearing compartment, conventional centering springs are constrained in axial length. For a given spring stiffness, shorter spring lengths result in thinner and more highly-stressed beams or members. Generally, relatively thin, highly stressed members reduce the fatigue life of the centering spring whereas tight tolerances at interfaces increase cost and complexity.

Since gas turbine engine manufacturers continually seek to reduce the cost and complexity of gas turbine components while striving to increase fatigue life, a need exists for new centering spring designs that resolve the fatigue life and complexity concerns of conventional centering springs without interfering with the geometric constrains of small bearing compartments.

SUMMARY

An assembly includes a centering spring having an annular flange, an annular body, and a resilient member extending from the flange to the body. The annular flange defines a passage that extends at least radially inward with respect to a centerline circumscribed by the flange from a radially outer surface of the flange to a radially inner surface of the flange. The annular body is spaced from the flange along the centerline such that a radially outer surface of the body is spaced from an adjacent surface to form a first annular cavity configured to be a first fluid damper. A deflection of the body relative to the flange is restrained by a restoring force produced by the resilient member and the first fluid damper.

In another aspect, an assembly for supporting a bearing assembly within a bearing compartment of a gas turbine engine includes a centering spring, a support structure encircling the centering spring, a first bearing, a first damping cavity, and a second damping cavity. The first damping cavity is defined by opposing surfaces of a first bearing housing and the first bearing, and the second damping cavity is defined by opposing surfaces of a second bearing housing and the support structure. The centering spring includes the first bearing housing that circumscribes a rotor centerline of the gas turbine engine and defines a housing passage, the second bearing housing spaced from the first bearing housing, and a plurality of resilient members extending from the first bearing housing to the second bearing housing. The housing passage extends from a radially outer surface of the first bearing housing to a radially inner surface of the first bearing housing to communicate with the first damping cavity. The deflection of the second bearing housing relative to the first bearing housing is restrained by a restoring force of the plurality of resilient members and the second damping cavity.

In yet another aspect, a method for supporting a first bearing relative to a second bearing includes providing a centering spring that has a first bearing housing mated to and restrained by a support structure for engaging a first bearing, a second bearing housing spaced from the first bearing housing for engaging the second bearing, and a plurality of resilient beams extending from the first bearing housing to the second bearing housing. The method further includes passing a fluid through a passage defined by the first bearing housing to a first annular cavity defined between a radially inner surface of the first bearing housing and an outer race of the first bearing. The first annular cavity is operative as a first fluid damper.

DETAILED DESCRIPTION

The present application describes a centering spring configured to support one or more anti-friction bearings and to deliver damping fluid to at least one anti-friction bearing. This configuration permits the centering spring to incorporate the bearing support, which in conventional bearing compartments, supports the bearing with respect to a casing as well as delivers damping fluid to the damping cavity of the bearing. Additionally, because a conventional bearing support is not required, centering springs capable of supporting one or more anti-friction bearings and delivering damping fluid to the bearings allow the centering spring to be axially longer. For a given spring stiffness and bearing deflection, a longer centering spring has smaller bending stresses than a shorter centering spring, which in turn, results in a more reliable, higher fatigue life design.

Figure 1A:
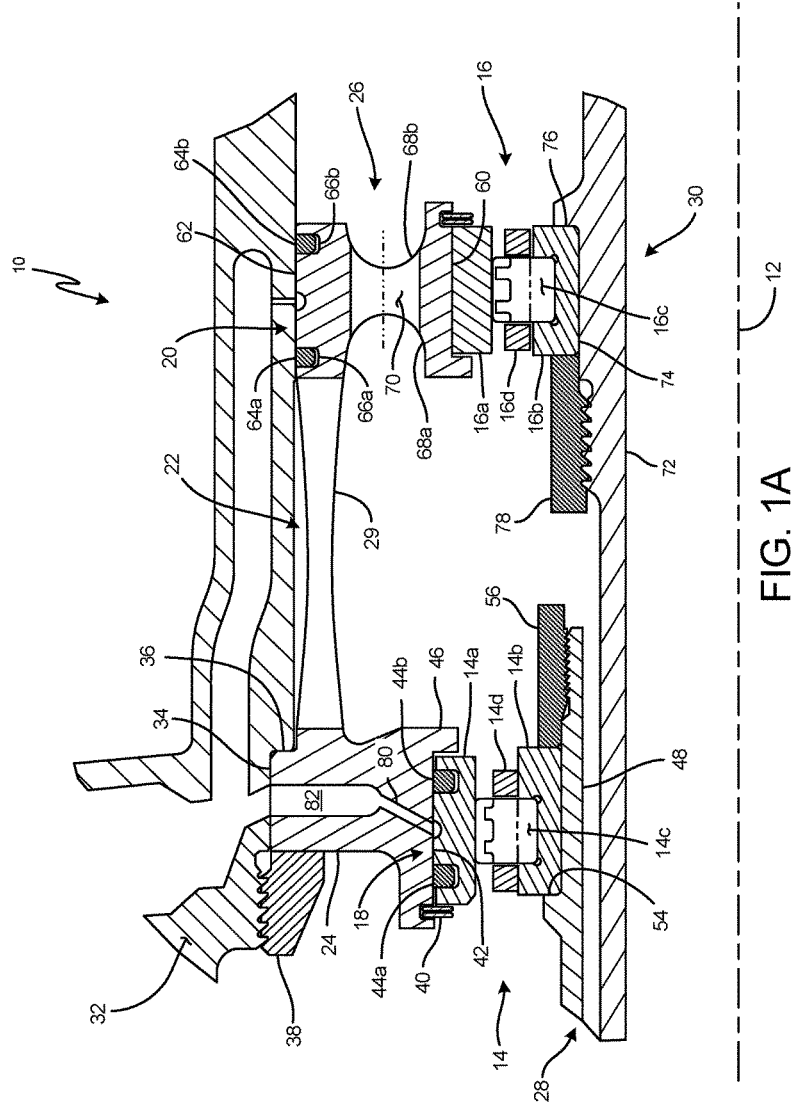
FIGS. 1A and 1B are cross-sectional views taken along a rotor centerline of a gas turbine engine showing a centering spring configured to form damping cavities for the forward and aft bearings supported by the centering spring.

FIG. 1 is a cross-sectional view of bearing compartment 10 taken along rotor centerline 12 of a gas turbine engine in which forward bearing 14 and aft bearing 16 are damped by forward damping cavity 18 and aft damping cavity 20, respectively. Extending from forward bearing 14 to aft bearing 16, centering spring 22 includes flange 24, body 26, and resilient member 29 extending from flange 24 to body 26. Forward bearing 14 and aft bearing 16 are anti-friction bearings of known design. The forward bearing has outer race 14a, inner race 14b, rolling elements 14c, and cage 14d. Aft bearing 16 has outer race 16a, inner race 16b, rolling elements 16c, and cage 16d. Forward bearing 14, aft bearing 16, and centering spring 22 restrain first spool 28 and second spool 30, which are concentrically disposed about rotor centerline 12. In some embodiments first spool 28 is a high pressure spool of a gas turbine engine whereas second spool 30 is a low pressure spool of a gas turbine engine. However, any bearing compartment containing multiple bearings in which dynamics analysis of the mating shafts require the bearings to be damped and at least one bearing to be disposed at a sprung end of centering spring 22 can benefit from the space-saving and fatigue life advantages of features described in bearing compartment 10.

Bounding bearing compartment 10 at its radial extent is casing 32, which has a generally annular cross-section along a plane perpendicular to rotor centerline 12 that varies, as required, along a length of rotor centerline 12 to accommodate geometry of bearing compartment 10. Casing 32 radially restrains one end of centering spring 22 by engaging radially outer surface 34 of flange 24. For example, some embodiments include a location or interference fit between radially outer surface 34 of flange 24 and a radially inner surface of casing 32. Axially restraining centering spring 22 with respect to casing 32 is axial stop 36. Formed by an upstream-facing surface of casing 32, stop 36 engages a downstream-facing surface of flange 24. Restraining centering spring 22 in the opposing axial direction is retaining nut 38, which engages an internal threaded portion of casing 32. When nut 38 is tightened against an upstream-facing surface of flange 24, centering spring 22 is captured between retaining nut 38 and stop 36 of casing 24. Rotation of retaining nut 38 and subsequent loosening of centering spring 22 is prevented by methods known in the art. For example, an anti-rotation tab (not shown in FIG. 1) affixed to casing 32 prevents rotation of nut 38 relative to casing 32. In other regions of bearing compartment 10, similar anti-rotation mechanisms are used to prevent loosening of threaded joints, the methods for which are well known and will not be described further.

Figure 1B:
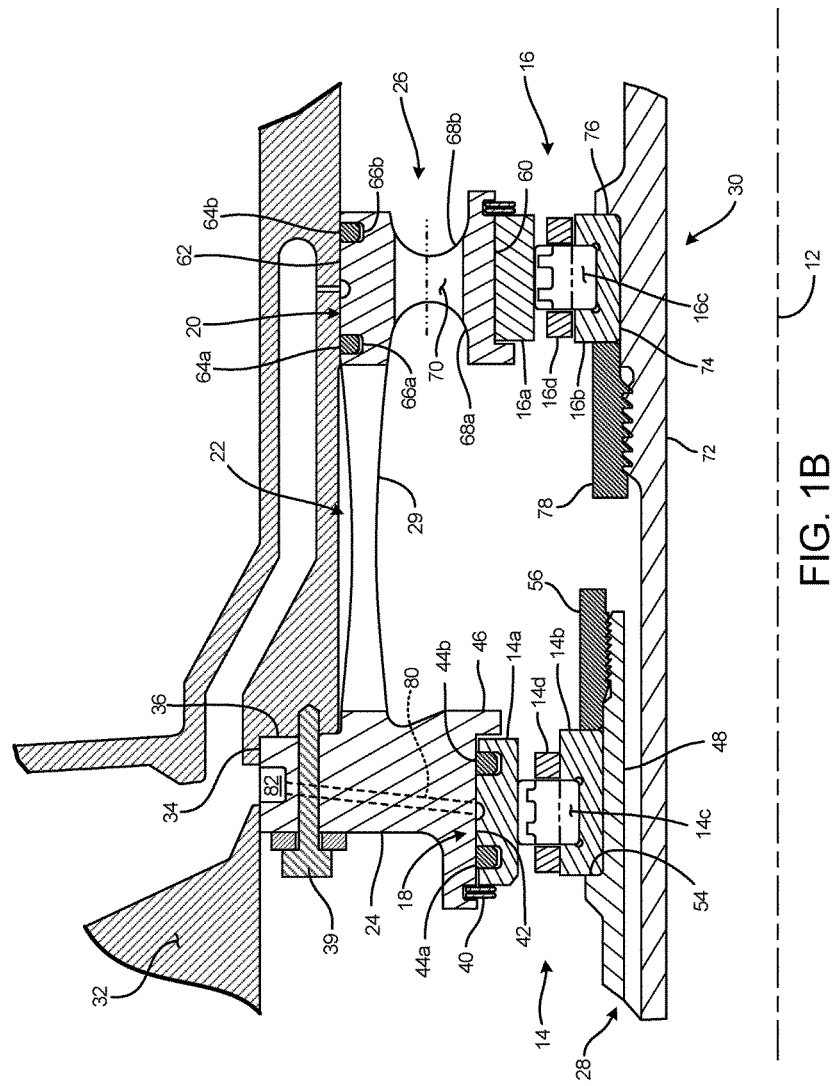

Alternatively, centering spring 22 can be axially restrained by a plurality of fasteners that are circumferentially-spaced along flange 24 and that extend through clearance holes contained within flange 24 to engage casing 32 as shown in FIG. 1B. This arrangement can be used instead of retaining nut 38.

At radially inner surface 42 of flange 24, outer race 14a is spaced therefrom to define damping cavity 18. Piston seals 44a and 44b enclose axial ends of damping cavity 18 such that fluid delivered to cavity 18 is captured between flange 24 and forward bearing 14. Supplying damping cavity 18 with a damping fluid (e.g., the lubrication fluid supplied to bearing compartment 10) radially restrains forward bearing 14 with respect to centering spring 22 and casing 32. Flange 24 includes axial stop 46, which protrudes radially inward from flange 24 at an aft end of flange 24 such that it is positioned axially downstream from outer race 14a. Restraining forward bearing 14 is the opposing axial direction is retaining element 40, which protrudes radially inward relative to radially inner surface 42 of flange 24.

Inner race 14b of forward bearing 14 is affixed to shaft 48 using known methods such as a location or interference fit between mating surfaces of inner race 14b and shaft 48. Shaft 48 is concentrically assembled with respect to and configured to rotate about rotor centerline 12. Axial stop 54 and nut 56 axially capture inner race 14b onto shaft 48. Stop 54 is formed by a portion of shaft 48 which extends radially outward from an outer surface of shaft 48. Nut 56 engages a threaded portion at an aft end of shaft 48. With this arrangement, forward bearing 14 radially restrains shaft 48 with respect to centering spring 22 and casing 32 while damping cavity 18 modifies the radial stiffness at forward bearing 14 to satisfy dynamic conditions of spool 28.

Extending axially from flange 24 to body 26, centering spring 22 includes a resilient member 29. In some embodiments, resilient member 29 is a single cylindrical member extending from flange 24 to body 26, providing a relatively stiff and robust resilient member 29 as compared to multi-beam resilient members 29 used in other embodiments. In such other embodiments, resilient member 29 includes a plurality of discrete resilient beams which are circumferentially-spaced about rotor centerline 12. Each beam 29 has a cross-sectional area along a plane perpendicular to rotor centerline 12 that varies along the axial length of each beam 29 between flange 24 and body 26. For example, each beam 29 can have a substantially polygonal cross-section, circular cross-section, or oval-shaped cross-section along its length. These cross-sections can have a decreasing cross-sectional area between flange 24 and a midpoint of beams 29 and an increasing cross-sectional area between the midpoint of beams 29 and body 26, the midpoint of beams 29 being a location approximately equal to half the axial length of beam 29. Moreover, to uniformly distribute bending stresses within beams 29, some embodiments vary the cross-sections proportionally in a height direction that is generally aligned with a radial direction with respect to rotor centerline 12 and a width direction that is generally tangent to a circumferential direction with respect to rotor centerline 12.

At an aft end of centering spring 22, outer race 16a of aft bearing 16 engages radially inner surface 60 of body 26, thereby radially restraining aft bearing 16 with respect to body 26. Outer race 16a is axially restrained in a similar manner as outer race 14a, being captured between a stop, which protrudes from inner surface 60, and a retaining element. At a radially outer extent of body 26, outer surface 62 is spaced from an opposing surface of casing 32 to form damping cavity 20. Like damping cavity 18, damping cavity 20 has axial ends which are enclosed by piston ring seals 64a and 64b. Piston rings seals 64a and 64b are captured within grooves 66a and 66b which extend circumferentially along outer surface 62 of body 26. In some embodiments, piston rings 44a and 44b enclosing damping cavity 18 and piston rings 64a and 64b enclosing damping cavity 20 can be omitted along with the grooves capturing each ring. Although such embodiments generally obtain lower fluid pressures within damping cavities 18 and 20, eliminating piston rings 44a, 44b, 64a, and 64b simplify the design of bearing compartment 10. Fluid lost through axial ends of damping cavities 18 and 20 are captured within bearing compartment 10 and are recirculated within the lubrication system.

Generally, body 26 has an annular cross-section in a plane perpendicular to rotor centerline 12 and has a radial dimension sufficient to span between casing 32 and outer race 16a of aft bearing 16. Because this radial span is generally not required for strength, body 26 optionally includes channels 68a and 68b that extend circumferentially along respective axial ends of body 26. Moreover, body 26 can also include a plurality of axially-extending through-holes 70 that are circumferentially spaced with respect to rotor centerline 12 in a region of body 26 between inner surface 60 and outer surface 62 of body 26. For example, channels 68a and 68b can be semi-circular or have a full-radius shape, and through-holes 70 can have a circular cross-section to reduce stress concentrations resulting from these features. Thus, channels 68a and 68b and through-holes 70 reduce the weight of body 26 without reducing the mechanical performance of centering spring 22.

Aft bearing 16 engages shaft 72, which rotates about rotor centerline 12, at radially inner surface 74 of inner race 16b. Like forward bearing 14, inner race 16b of aft bearing 16 is radially restrained by a location or interference fit between inner surface 74 and an outer surface of shaft 72. Bearing 16 is axially captured between stop 76 and nut 78. Stop 76 is formed by a radially extending portion of shaft 72 that forms an axial face for engaging inner race 16b. Nut 78 engages a threaded portion of shaft 72 disposed upstream from aft bearing 16. Thus, aft bearing 16 has a radial stiffness determined at least in part by the bending stiffness of resilient member 29 and damping cavity 20.

The damping characteristics of damping cavities 18 and 20 and the stiffness characteristics of centering spring 22, which is primarily determined by the stiffness of resilient member 29, are selected using methods known in the art and, typically, are a defined range determined through dynamic analysis of spool 28 and spool 30. Deflections, especially radial defections, of body 26 relative to flange 24 are restrained by a restoring force produced by the deformation the resilient member along with the damping effect produced by fluid within damping cavity 20 during operating of the gas turbine engine.

To facilitate this configuration, flange 24 defines one or more passages 80 that extend from radially outer surface 34 to radially inner surface 42 to communicate with damping cavity 18 through which a damping fluid flows during operation of the gas turbine engine. In some embodiments, flange 24 includes groove 82, which extends circumferentially along outer surface 34 to evenly distribute the damping fluid among a plurality of passages 80. The plurality of passages 80 extend in at least a radial direction while being circumferentially-distributed within flange 24 in order to evenly distribute damping fluid within damping cavity 18 during operation of the gas turbine engine.

With this configuration, centering spring 22 functions as a bearing support which would otherwise support forward bearing 14. Integrating the centering spring and bearing support functions into one component (e.g., centering spring 22) reduces the number of components within bearing compartment 10 and permits centering spring 22 to occupy a larger axial space within bearing compartment 10 than a similarly-sized compartment with discrete bearing supports and centering spring. Thus, centering spring 22 can be designed with a longer resilient member 29 than would otherwise be possible, decreasing the bending stresses in resilient member 29 for a given spring stiffness and bearing deflection. Reducing the bending stresses carried by resilient member 29 results in a more reliable, longer fatigue life centering spring 22.

Figure 2:
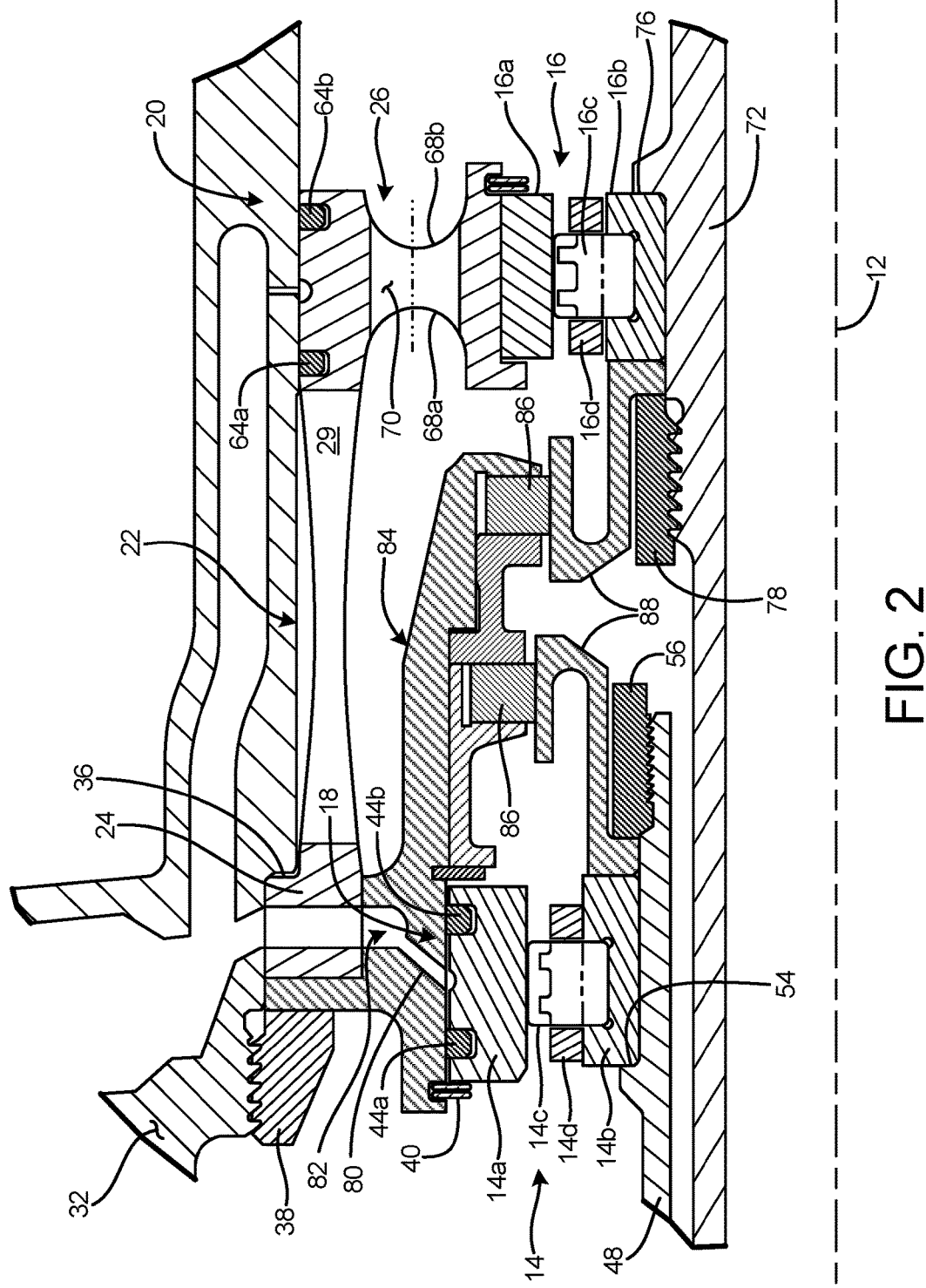
FIG. 2 is a cross-section view along a rotor centerline of a gas turbine engine showing a centering spring flange that replaces the forward bearing support member of FIG. 1 and engages a seal runner incorporated into the forward bearing stack.

Reducing the number of components within bearing compartment 10 also permits other components to be positioned more advantageously within bearing compartment 10. For example, FIG. 2 shows centering spring 22 in which seal carrier 84 is disposed between flange 24 and outer race 14a of forward bearing 14. All other reference numbers in FIG. 2 represent similarly numbered components of FIG. 1. With this arrangement, seal carrier 84 is radially and axially restrained by flange 24 and retaining nut 38, thereby eliminating the need for seal carrier 84 to be captured between forward bearing 14 and aft bearing 16. As is known in the art, seal carrier 84 engages one or more seal elements 86, which in turn interface with one or more rotating seal runners 88. Sealing elements 86 are axially restrained with respect to seal carrier 84 using various retaining rings as is known in the art.

Discussion of Possible Embodiments

The following are non-exclusive descriptions of possible embodiments of the present invention.

An assembly according to an exemplary embodiment of this disclosure, among other possible things includes a centering spring having an annular flange, an annular body, and a resilient member extending from the flange to the body. The annular body has a radially outer surface that is spaced from an adjacent surface to form a first annular cavity configured to be a first fluid damper. The annular flange defines a passage extending at least radially inward with respect to a centerline circumscribed by the flange from a radially outer surface of the flange to a radially inner surface of the flange. The resilient member and the first fluid damper restrain a displacement of the body relative to the flange with a restoring force.

The assembly of the preceding paragraph can optionally include, additionally and/or alternatively, any one or more of the following features, configurations and/or additional components:

A further embodiment of the foregoing assembly can further include a housing at least partially defined by the adjacent surface and disposed radially outward from the flange, the body, and the plurality of resilient beams.

A further embodiment of any of the foregoing assemblies can further include a first bearing that is spaced from the radially inner surface of the flange to form a second annular cavity. The second annular cavity can be configured to form a second fluid damper.

A further embodiment of the foregoing assembly, wherein the passage can communicate between the second annular cavity and the radially outer surface of the flange.

A further embodiment of any of the foregoing assemblies can further include a second bearing that mates with the radially inner surface of the body.

A further embodiment of any of the foregoing assemblies, wherein the body can define a plurality of circumferentially-spaced holes that extend in a substantially axial direction through the body between the radially outer surface of the body and the second bearing.

A further embodiment of any of the foregoing assemblies can further include a fastening element and an axially-rearward-facing surface of the flange that can be configured to mate with the housing such that the fastening element and the axially-rearward-facing surface of the flange axially restrain the centering spring relative to the housing.

A further embodiment of any of the foregoing assemblies, wherein the fastening element can be one of a nut mating with an axially-forward-facing surface of the flange and a plurality of fasteners circumferentially-spaced along and extending through the flange.

A further embodiment of any of the foregoing assemblies can further include a seal carrier mated to the radially inner surface of the flange, the seal carrier supporting one or more sealing elements that interface with one or more seal runners.

A further embodiment of any of the foregoing assemblies can further include a first bearing spaced from a radially inner surface of the seal carrier to form a second annular cavity, the second annular cavity operative as a second fluid damper.

A further embodiment of any of the foregoing assemblies can further include a second bearing that mates with the radially inner surface of the body.

A further embodiment of any of the foregoing assemblies can further include a housing at least partially defined by the adjacent surface in which the housing can be radially outward from the flange, the body, and the plurality of resilient beams.

A further embodiment of any of the foregoing assemblies, wherein the radially outer surface of the flange can define a circumferentially-extending groove that intersects the passage.

A further embodiment of any of the foregoing assemblies in which the resilient member can include a plurality of beams extending from the flange to the body such that a deflection of the body relative to the flange is restrained by a restoring force of the plurality of beams and the first fluid damper.

A further embodiment of any of the foregoing assemblies, wherein each of the plurality of beams have a plurality of cross-sections, the cross-sections varying along a length between the flange and the body.

A further embodiment of any of the foregoing assemblies, wherein the cross-sections of each beam can be polygonal, circular, or oval-shaped.

A further embodiment of any of the foregoing assemblies, wherein the minimum cross-section of each beam is disposed at a midpoint between the flange and the body.

An assembly for supporting a bearing assembly within a bearing compartment of a gas turbine engine according to an exemplary embodiment of this disclosure, among other possible things includes a centering spring having a first bearing housing (i.e., flange) circumscribing a rotor centerline of the gas turbine engine, a passage defined by the first bearing housing that extends from a radially outer surface of the first bearing housing to a radially inner surface of the first bearing housing, a second bearing housing (i.e., body) spaced from the first bearing housing along the rotor centerline, and a plurality of resilient members extending from the first bearing housing to the second bearing housing.

The assembly of the preceding paragraph can optionally include, additionally and/or alternatively, any one or more of the following features, configurations and/or additional components:

A further embodiment of the foregoing assembly can further include a support structure encircling the centering spring, the support structure defining an axially-facing surface configured to engage the first bearing housing.

A further embodiment of any of the foregoing assemblies can further include a first bearing support by the first bearing housing.

A further embodiment of any of the foregoing assemblies can further include a first damping cavity defined by opposing surfaces of the first bearing housing and the first bearing, the passage being configured to communicate with the first damping cavity.

A further embodiment of any of the foregoing assemblies can further include a second damping cavity defined by opposing surfaces of the second bearing housing and the support structure. A deflection of the second bearing housing relative to the first bearing housing is restrained by a restoring force of the plurality of resilient members and the second damping cavity.

A further embodiment of any of the foregoing assemblies, wherein the support structure can define a first supply passage and a second supply passage.

A further embodiment of any of the foregoing assemblies, wherein the first supply passage extends radially through the support structure to communicate with the passage of the first bearing housing.

A further embodiment of any of the foregoing assemblies, wherein the second supply passage extends radially through the support structure to communicate with the second damping cavity.

A further embodiment of any of the foregoing assemblies can further include a first piston seal and a second piston seal spaced along an outer race of the first bearing.

A further embodiment of any of the foregoing assemblies, wherein the first and second piston seals engage grooves within the outer race of the first bearing to seal axial ends of the first damping cavity.

A further embodiment of any of the foregoing assemblies, wherein each of the plurality of resilient members have a plurality of cross-sections, the cross-sections varying along a length between the first bearing housing and the second bearing housing.

A method of supporting a first bearing relative to a second bearing according to an exemplary embodiment of this disclosure, among other possible things includes providing a centering spring having a first bearing housing, a second bearing housing, and a plurality of resilient beams extending from the first bearing housing to the second bearing housing.

The method of the preceding paragraph can optionally include, additionally and/or alternatively, any one or more of the following features, configurations and/or additional components:

A further embodiment of the foregoing method, wherein the first bearing is mated to and restrained by a support structure for engaging the first bearing.

A further embodiment of any of the foregoing methods, wherein the second bearing is spaced from the first bearing housing for engaging the second bearing.

A further embodiment of any of the foregoing methods can further include passing a fluid through a passaged defined by the first bearing housing to a first annular cavity defined between a radially inner surface of the first bearing housing and an outer race of a first bearing, the first annular cavity being operative as a first fluid damper.

A further embodiment of any of the foregoing methods can further include passing the fluid through the support structure to a second annular cavity defined between the support structure and a radially outer surface of the second bearing housing.

A further embodiment of any of the foregoing methods, wherein providing the centering spring can include configuring the plurality of beams such that a deflection of the second bearing housing relative to the first bearing housing is restrained by a restoring force of the plurality of beams and the first fluid damper.

A further embodiment of any of the foregoing methods can further include mating a second bearing to a radially inner surface of the second bearing housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
a centering spring comprising:
an annular flange defining a passage that extends at least radially inward with respect to a centerline circumscribed by the flange;
an annular body spaced from the flange along the centerline, wherein a radially outer surface of the body is spaced from an adjacent surface to form a first annular cavity operative as a first fluid damper; and
a resilient member extending from the flange to the body, wherein a deflection of the body relative to the flange is restrained by a restoring force of the resilient member and the first fluid damper;
wherein the passage extends from a radially outer surface of the flange to a radially inner surface of the flange.

2. The assembly of claim 1 and further comprising:
a housing at least partially surrounding the flange, the body, and the resilient member, wherein the housing includes the adjacent surface.

3. The assembly of claim 2 and further comprising:
a first bearing that is spaced from the radially inner surface of the flange to form a second annular cavity, wherein the second annular cavity is operative as a second fluid damper, and wherein the passage communicates between the second annular cavity and the radially outer surface of the flange; and
a second bearing that mates with a radially inner surface of the body.

4. The assembly of claim 3, wherein the body defines a plurality of circumferentially-spaced holes extending in a substantially axial direction through the body between the radially outer surface of the body and the second bearing.

5. The assembly of claim 3, wherein the passage includes a groove defined by the flange that extends circumferentially along the radially outer surface of the flange.

6. The assembly of claim 2 and further comprising:
a fastening element; and
an axially-rearward-facing surface of the flange configured to mate with an axially-forward-facing surface of the housing, wherein the fastening element and the axially-forward-facing surface of the housing axially restrain the centering spring relative to the housing.

7. The assembly of claim 6, wherein the fastening element is one of a retaining nut mating with an axially-forward-facing surface of the flange and a plurality of fasteners circumferentially-spaced along and extending through the flange.

8. The assembly of claim 1 and further comprising:
a seal carrier mated to the radially inner surface of the flange, wherein the seal carrier supports one or more sealing elements that interface with one or more seal runners;
a first bearing spaced from a radially inner surface of the seal carrier to form a second annular cavity, the second annular cavity operative as a second fluid damper;
a second bearing that mates with the radially inner surface of the body; and
a housing at least partially surrounding the flange, the body, and the plurality of beam, wherein the housing includes the adjacent surface.

9. The assembly of claim 1, the resilient member comprising:
a plurality of beams extending from the flange to the body, wherein a deflection of the body relative to the flange is restrained by a restoring force of the plurality of beams and the first fluid damper.

10. The assembly of claim 9, wherein each of the plurality of beams have a plurality of cross-sections, the cross-sections varying along a length between the flange and the body.

11. The assembly of claim 10, wherein the cross-sections of each beam are polygonal, circular, or oval-shaped.

12. The assembly of claim 10, wherein a minimum cross-section of each beam is disposed at a midpoint between the flange and the body.

13. An assembly for supporting a bearing assembly within a bearing compartment of a gas turbine engine, the assembly comprising:
a centering spring comprising:
a first bearing housing circumscribing a rotor centerline of the gas turbine engine;
a passage defined by the first bearing housing that extends from a radially outer surface of the first bearing housing to a radially inner surface of the first bearing housing;
a second bearing housing spaced from the first bearing housing along the rotor centerline; and
a plurality of resilient members extending from the first bearing housing to the second bearing housing;
a support structure encircling the centering spring, the support structure defining an axially-facing surface configured to engage the first bearing housing;
a first bearing supported by the first bearing housing;
a first damping cavity defined by opposing surfaces of the first bearing housing and the first bearing, wherein the passage is configured to communicate with the first damping cavity; and
a second damping cavity defined by opposing surfaces of the second bearing housing and the support structure;
wherein a deflection of the second bearing housing relative to the first bearing housing is restrained by a restoring force of the plurality of resilient members and the second damping cavity.

14. The assembly of claim 13, wherein the support structure defines a first supply passage and a second supply passage, the first supply passage extending radially through the support structure to communicate with the passage of the first bearing housing and the second supply passage extending radially through the support structure to communicate with the second damping cavity.

15. The assembly of claim 13 and further comprising:
a first piston seal; and
a second piston seal spaced along an outer race of the first bearing, wherein the first and second piston seals engage grooves within the outer race of the first bearing to seal axial ends of the first damping cavity.

16. The assembly of claim 13, wherein each of the plurality of resilient members have a plurality of cross-sections, the cross-sections varying along a length between the first bearing housing and the second bearing housing.

17. A method of supporting a first bearing and a second bearing, the method comprising:
- providing a centering spring, the centering spring comprising:
  - a first bearing housing mated to and restrained by a support structure for engaging the first bearing;
  - a second bearing housing spaced from the first bearing housing for engaging the second bearing; and
  - a plurality of resilient beams extending from the first bearing housing to the second bearing housing; and
- passing a fluid through a passage defined by the first bearing housing to a first annular cavity defined between a radially inner surface of the first bearing housing and an outer race of a first bearing, wherein the first annular cavity is operative as a first fluid damper.

18. The method of claim 17 and further comprising:
- passing the fluid through the support structure to a second annular cavity defined between the support structure and a radially outer surface of the second bearing housing, wherein the second annular cavity is operative as a second fluid damper.

19. The method of claim 18, wherein providing the centering spring includes configuring the plurality of beams such that a deflection of the second bearing housing relative to the first bearing housing is restrained by a restoring force of the plurality of beams and the second fluid damper.

20. The method of claim 17 and further comprising:
- mating the second bearing to a radially inner surface of the second bearing housing.

* * * * *